United States Patent
Takemoto

(10) Patent No.: US 11,275,434 B2
(45) Date of Patent: Mar. 15, 2022

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Kazuki Takemoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/666,150

(22) Filed: Oct. 28, 2019

(65) Prior Publication Data

US 2020/0133388 A1  Apr. 30, 2020

(30) Foreign Application Priority Data

Oct. 31, 2018 (JP) .............................. JP2018-205859

(51) Int. Cl.
| | |
|---|---|
| *G06F 3/01* | (2006.01) |
| *G06K 9/00* | (2022.01) |
| *H04N 13/275* | (2018.01) |
| *H04N 13/15* | (2018.01) |
| *H04N 13/332* | (2018.01) |
| *H04N 13/00* | (2018.01) |

(52) U.S. Cl.
CPC .......... *G06F 3/012* (2013.01); *G06K 9/00214* (2013.01); *G06K 9/00375* (2013.01); *G06K 9/00382* (2013.01); *H04N 13/15* (2018.05); *H04N 13/275* (2018.05); *H04N 13/332* (2018.05); *H04N 2013/0085* (2013.01)

(58) Field of Classification Search
None
See application file for complete search history.

(56) References Cited

U.S. PATENT DOCUMENTS

| | | | | |
|---|---|---|---|---|
| 2009/0128564 | A1* | 5/2009 | Okuno ................... | G06T 19/006 345/427 |
| 2010/0026714 | A1* | 2/2010 | Utagawa ................ | G06T 19/006 345/633 |

(Continued)

FOREIGN PATENT DOCUMENTS

| | | |
|---|---|---|
| JP | 2004-109994 A | 4/2004 |
| JP | 2018-120173 A | 8/2018 |

*Primary Examiner* — Hilina K Demeter
(74) *Attorney, Agent, or Firm* — Canon U.S.A., Inc. IP Division

(57) ABSTRACT

An information processing apparatus supplies, an image display apparatus including an image capturing unit configured to capture an image of a real space, and a display unit configured to display an image generated using the image captured by the image capturing unit, an image generated using the image captured by the image capturing unit. The information processing apparatus includes a generation unit configured to generate an image depicting a specific object at a position at which the specific object is estimated to be present after a predetermined time from a time when the image display apparatus starts to move in the captured image of the real space including the specific object, and a control unit configured to shift a position at which the image generated by the generation unit is displayed on the display unit based on a change in a position and/or an orientation of the image display apparatus.

13 Claims, 15 Drawing Sheets

(56) References Cited

U.S. PATENT DOCUMENTS

| | | | | |
|---|---|---|---|---|
| 2010/0321383 | A1* | 12/2010 | Nakamura | G06F 3/017 345/419 |
| 2014/0267028 | A1* | 9/2014 | Matsuda | G06F 3/011 345/156 |
| 2015/0279102 | A1* | 10/2015 | Fleck | G06F 3/012 345/419 |
| 2016/0054859 | A1* | 2/2016 | Oshima | G06F 3/0425 345/175 |
| 2016/0080633 | A1* | 3/2016 | Hong | G06K 9/00342 348/169 |
| 2017/0109937 | A1* | 4/2017 | Koga | G06F 3/011 |
| 2017/0323479 | A1* | 11/2017 | Mokuya | G06T 19/003 |

\* cited by examiner t   t + Δt   → TIME

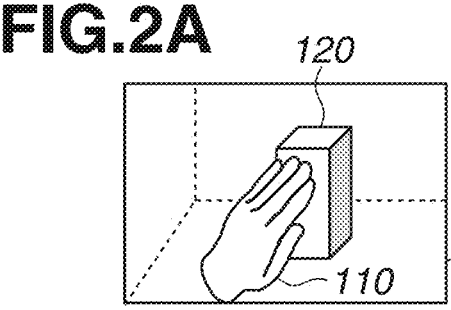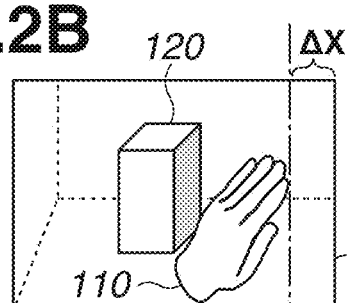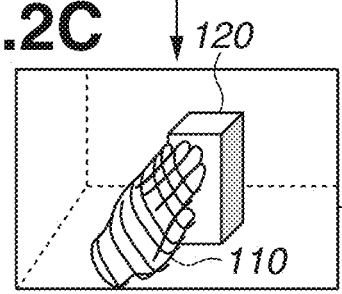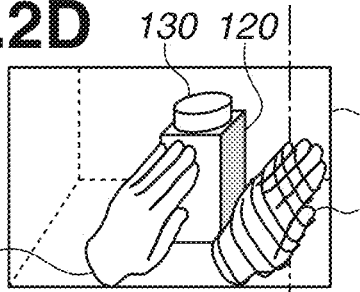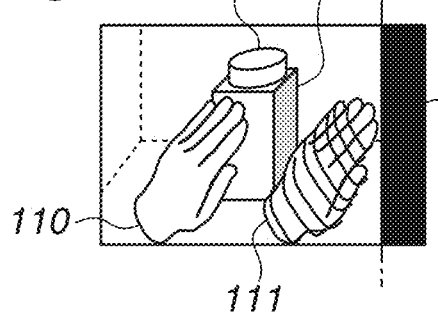

INFORMATION PROCESSING APPARATUS, INFORMATION PROCESSING METHOD, AND STORAGE MEDIUM

BACKGROUND

Field of the Disclosure

The present disclosure relates to virtual reality and mixed reality systems.

Description of the Related Art

In order to achieve a reduction in the time and cost of a test production process in design and production fields, virtual reality (VR) and mixed reality (MR) systems are utilized. In these systems, the ease of assembly and the maintainability can be evaluated using design (shape and design) data created by a computer aided design system (CAD) without the need for a test production of a real product. These systems use a head-mounted display (HMD). The HMD is directly worn on the head of a user so as to cover the entire visual field of the user, and displays a video image that enables the user to experience a virtual reality from a viewpoint corresponding to the position/orientation of the user. If the position or orientation of the HMD varies due to the movement of the user, a video image obtained before the user moves is displayed on the HMD because it takes a certain time to complete processing for generating a video image to be displayed on the HMD. In this case, a video image different from the video image that is expected by the user is displayed, which provides the user with a feeling of strangeness (feeling of strangeness due to a feeling of delay) in the video image. In this regard, Japanese Patent Application Laid-Open No. 2004-109994 discusses a method in which a display image is shifted within a screen by the amount of delay time corresponding to a variation in orientation so as to reduce a feeling of delay.

The method discussed in Japanese Patent Application Laid-Open No. 2004-109994 only shifts an image obtained before a rapid movement of the position/orientation of a moving object, without estimating a direction in which the moving object moves even when the moving object is present in a real space. Accordingly, caused by a change in the position/orientation of the HMD, the moving object may be displayed in a direction opposite to the direction in which the position at which the moving object is to be displayed is moved. In other words, the motion of the moving object in the real space is not taken into consideration in the method discussed in Japanese Patent Application Laid-Open No. 2004-109994, which makes it difficult to reduce a delay in the video image including the moving object.

SUMMARY

Some embodiments are directed to a technique capable of reducing a feeling of strangeness given to a user when a moving object is not displayed at a position at which the moving object is to be displayed when a rapid change in the position/orientation of a head-mounted display (HMD) wearer occurs, even in a case where the moving object is present in a scene.

According to an aspect of some embodiments, an information processing apparatus that supplies, to an image display apparatus including an image capturing unit configured to capture an image of a real space, and a display unit configured to display an image generated using the image captured by the image capturing unit, an image generated using the image captured by the image capturing unit, includes a generation unit configured to generate an image depicting a specific object at a position at which the specific object is estimated to be present after a predetermined period from a time when the image display apparatus starts to move in the captured image of the real space including the specific object, and a control unit configured to shift a position at which the image generated by the generation unit is displayed on the display unit based on a change in a position and/or an orientation of the image display apparatus.

Further features of various embodiments will become apparent from the following description of exemplary embodiments with reference to the attached drawings.

BRIEF DESCRIPTION OF THE DRAWINGS

FIGS. 2A, 2B, 2C, 2D, and 2E each illustrate a display example of an image generated by an information processing apparatus.

DESCRIPTION OF THE EMBODIMENTS

Exemplary embodiments will be described in detail below with reference to the accompanying drawings.

A head-mounted display (HMD) incorporates a display for both eyes and a headphone for both ears. When a user wears the HMD on the user's head, the user can watch still images and moving images to be displayed on the display and can listen to sound, music, and the like output from the headphone. In a first exemplary embodiment, an example of the HMD to be used for a mixed reality (MR) system is described. In this case, an information processing apparatus connected to the HMD combines an image in a real space captured from an image capturing unit provided in the HMD with an image in a virtual space, and outputs a combined image as a video image, which enables the user to experience the mixed reality, to a display unit provided in the HMD. A gyroscope sensor, an acceleration sensor, or the like, which is incorporated in the HMD or externally attached to the HMD, may be used to measure positional information about the head of the user wearing the HMD and orientation information, such as a rotation angle and an inclination of the head of the user. The orientation information is obtained as a result of measuring a relative movement of the HMD by using an orientation sensor, such as a gyroscope sensor. Images or video images to be described below are examples of images generated by the information processing apparatus. Some or all of the generated images are presented to the user wearing the HMD. In the present exemplary embodiment, a method in which a moving object 110 is observed and arranged at a predicted position to thereby reduce a delay, is described. In the present exemplary embodiment, an example in which the moving object 110 is observed by a stereoscopic camera and a three-dimensional model is generated based on obtained three-dimensional shape information. Although an example using a three-dimensional model will be described below, an image to be displayed at a position at which a two-dimensional moving object area extracted from a captured image is predicted may be generated without using a three-dimensional model.

Figure 1A:
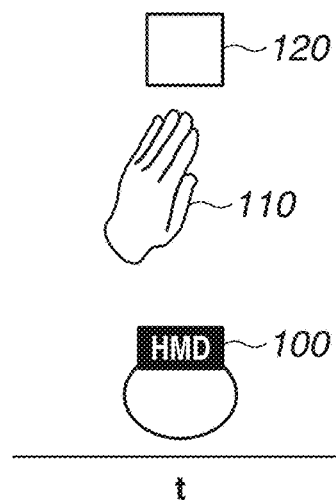
FIGS. 1A, 1B, 1C, 1D, 1E, and 1F each illustrate a display example of an image with a delay that may occur in a virtual reality space.
Figure 1B:
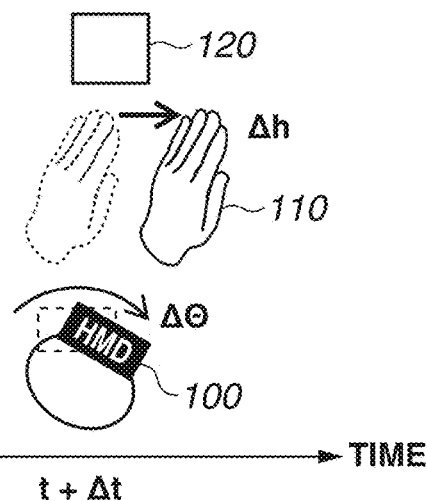
Figure 1C:
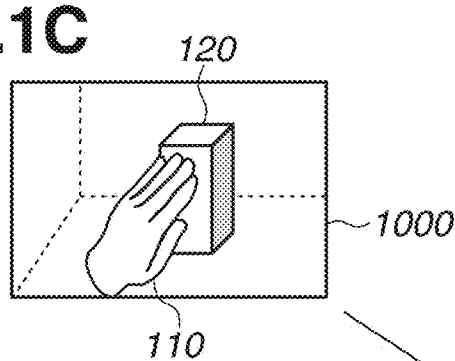
Figure 1D:
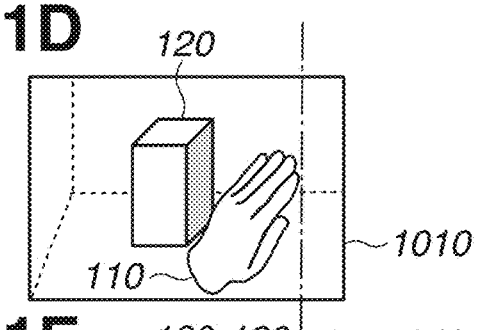
Figure 1E:
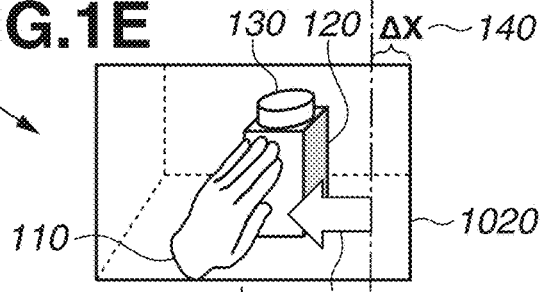
Figure 1F:
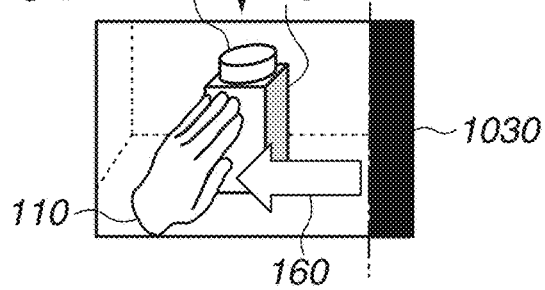

First, an example in which a delay of a video image including a specific object (e.g., a moving object or an object that has possibility to move) in the real space occurs in a virtual reality space will be described with reference to FIGS. 1A to 1F. FIG. 1A illustrates a positional relationship between the HMD that is present in the real space at a predetermined period "t" and each of the specific object (moving object 110) and a still object 120. Assume herein that the specific object is a hand of the HMD wearer as a typical example of the object that has possibility to move. FIG. 1B illustrates a positional relationship between the HMD and each of the moving object 110 and the still object 120 at a subsequent time "t+Δt" from the state illustrated in FIG. 1A. Assume that the time Δt is a delay time (e.g., 100 msec.) including at least a time required for the information processing apparatus to generate an image to be displayed on the HMD. FIG. 1B illustrates a state where the HMD is rotated rightward by a movement amount ΔΘ in Δt seconds and the moving object moves rightward by Δh with respect to the still object 120. FIGS. 1C and 1D illustrate ideal images with no delay at the time "t" and the time "t+Δt", respectively, from the viewpoint of the HMD. FIG. 1E illustrates an image 1020 in which a delay occurs in virtual space drawing processing. An object 130 is a computer graphics (CG) image depicting a CG model so as to match the real space. The image 1020 is obtained as a result of performing image processing on an image 1000 at the time "t", and is displayed with a delay corresponding to a time required for the image processing, regardless of the motion of the HMD. FIG. 1E illustrates a moving object depicted at a position shifted in a horizontal direction by a length indicated by an arrow 150 from an ideal display position of the moving object with no delay as illustrated in FIG. 1D. This may provide the HMD wearer with a feeling of strangeness in the video image of the virtual space in proportion to the length of the arrow 150. A dotted line passing through FIGS. 1D, 1E, and 1F indicates a field of view in which the image 1000 is visible, and also indicates that the image to be displayed is shifted by ΔX based on the motion of the HMD. On the other hand, FIG. 1F illustrates an image obtained by shifting the video image generated at the time "t" in the horizontal direction of the image by the amount ΔX in which the movement amount ΔΘ of the HMD is added. First, as for the shift amount ΔX, an amount of change between an orientation at a time close to an image capturing time and a latest orientation is obtained. Further, this amount of change is converted into an image shift amount in a vertical direction and an image shift amount in the horizontal direction on the combined image. A black area in an image 1030 indicates a state where an area in which no image is captured is displayed as the black area because the image is shifted. The position of the still object 120 illustrated in FIG. 1F is displayed at the position on a screen of the HMD the same as the position of the still object 120 illustrated in FIG. 1D. However, the moving object deviates from the position (ideal display position of the moving object illustrated in FIG. 1D) of the moving object at the actual time (time "t+Δt") by the amount corresponding to the length of an arrow 160, which provides the user with a feeling of delay in the moving object. This phenomenon is caused because the captured image 1000 obtained at the time "t" is shifted by the amount ΔX, while the movement distance Δh of the moving object that moves in Δt seconds is neglected. The length of the arrow 160 is longer than the length of the arrow 150, which corresponds to a difference between the position of the moving object obtained when processing for shifting the image illustrated in FIG. 1E is not included and the ideal display position illustrated in FIG. 1D. This may provide the HMD wearer with a stronger feeling of strangeness. The case where the HMD is rotated rightward and the hand of the HMD wearer moves rightward in parallel is merely an example. In other words, even when an image is displayed in consideration of a change in the position or orientation of the HMD, the motion of the specific object cannot be predicted and a processing time for generating an image to be displayed after the HMD is moved is further required, so that a video image that provides the HMD wearer with a feeling of strangeness may be displayed. Furthermore, in a video see-through HMD for providing a mixed reality, a time required for capturing an image of a real space by a camera mounted in the HMD and a time required for transmitting image information to the HMD from the information processing apparatus are added before the display video image described above is generated. Accordingly, the processing time required for generating an image is further increased, which may provide the user with a stronger feeling of strangeness due to a change in the orientation of the HMD or the moving object.

FIGS. 2A and 2B are schematic diagrams each illustrating an outline of processing to be performed by the information processing apparatus according to the present exemplary embodiment. FIGS. 2A and 2B illustrate the same images as those illustrated in FIGS. 1C and 1D, respectively. More specifically, FIG. 2B illustrates a positional relationship between the moving object 110 and the still object 120 at the subsequent time "t+Δt" from the state illustrated in FIG. 2A. Assume that the time Δt is a time (e.g., 100 msec.) required for the information processing apparatus to generate an image to be displayed on the HMD. FIG. 2B illustrates a state where the HMD is rotated rightward by the movement amount ΔΘ in Δt seconds, and the moving object moves rightward by Δh with respect to the still object 120. An image 2020 illustrated in FIG. 2C is a schematic diagram obtained by converting the moving object 110 in an image 2000 illustrated in FIG. 2A into a three-dimensional model. An image 2030 illustrated in FIG. 2D is an image in which a moving object model 111, which is converted into a three-dimensional model, is depicted at a three-dimensional position predicted based on the motion of the HMD and the moving object 110 is combined with the image 2000, which is a background image. In the image 2030, the image 2000 is used as the background, and thus the still object 120 and the state in a back space of the room are not changed from those in the image 2000. In the image 2030, the moving object model 111 is depicted at a position predicted based on the processing time and the motion of the HMD.

FIG. 2E illustrates an image 2040 obtained by shifting the image 2030 illustrated in FIG. 2D by the method discussed in Japanese Patent Application Laid-Open No. 2004-109994. As seen from FIG. 2E, the position of the still object 120 and the predicted position of the moving object model 111 are close to those in the ideal image 2010 with no delay as illustrated in FIG. 2B. Thus, the generation of the image in which the moving object 110 is also predicted makes it possible to present, to the user, a video image with less of a feeling of strangeness. Unless predetermined image processing is performed, the moving object 110 is depicted at the position of the image 2000.

Figure 3:
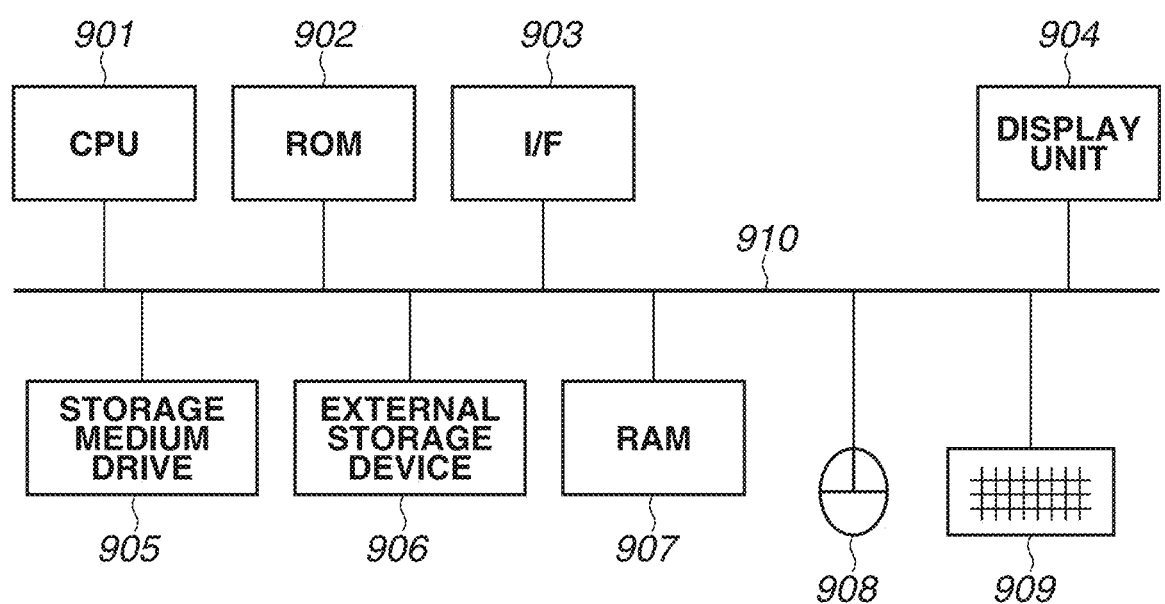
FIG. 3 is a block diagram illustrating a hardware configuration example of the information processing apparatus.

FIG. 3 is a block diagram illustrating a hardware configuration for implementing the information processing apparatus according to the present exemplary embodiment. A central processing unit (CPU) 901 controls an overall operation of a computer by using computer programs and data stored in a random access memory (RAM) 907 and a read-only memory (ROM) 902. The CPU 901 also executes each process to be performed by the information processing apparatus in the following exemplary embodiments. The RAM 907 temporarily stores computer programs and data loaded from an external storage device 906 and a storage medium drive 905. The RAM 907 includes an area for temporarily storing data received from an external apparatus. The RAM 907 also includes a work area used for the CPU 901 to execute each process. In this way, the RAM 907 can provide various areas, as needed. The ROM 902 stores setting data, a boot program, and the like for the computer. A keyboard 909 and a mouse 908 are examples of an operation input device. The user of the computer can input various instructions to the CPU 901 by operating the operation input device. A display unit 904 is a screen included in the information processing apparatus. Specifically, the display unit 904 is a display of a host personal computer (PC). The display unit 904 is composed of a cathode-ray tube (CRT) screen, a liquid crystal screen, or the like, and is capable of displaying the processing result obtained by the CPU 901 by using images, characters, and the like. The external storage device 906 is a large-capacity information storage device as typified by a hard disk drive device. The external storage device 906 stores an operating system (OS) and computer programs and data for causing the CPU 901 to execute various processes to be performed by the information processing apparatus. The computer programs and data stored in the external storage device 906 are loaded, as needed, into the RAM 907 under control of the CPU 901. The CPU 901 executes processing using the loaded programs and data, thereby executing each process to be performed by the information processing apparatus. The storage medium drive 905 reads out programs and data recorded on a storage medium such as a compact disc (CD)-ROM or a digital versatile disc (DVD)-ROM, and writes computer programs and data into the storage medium. Some or all of the programs and data stored in the external storage device 906 as described above may be recorded on the storage medium. The computer programs and data read out from the storage medium by the storage medium drive 905 are output to the external storage device 906 or the RAM 907. An interface (I/F) 903 is composed of an analog video port or a digital input/output port, such as Institute of Electrical and Electronics Engineers (IEEE) 1394. Data received via the I/F 903 is input to the RAM 907 or the external storage device 906. A bus 910 is used to connect the components described above using a bus signal.

Figure 4:
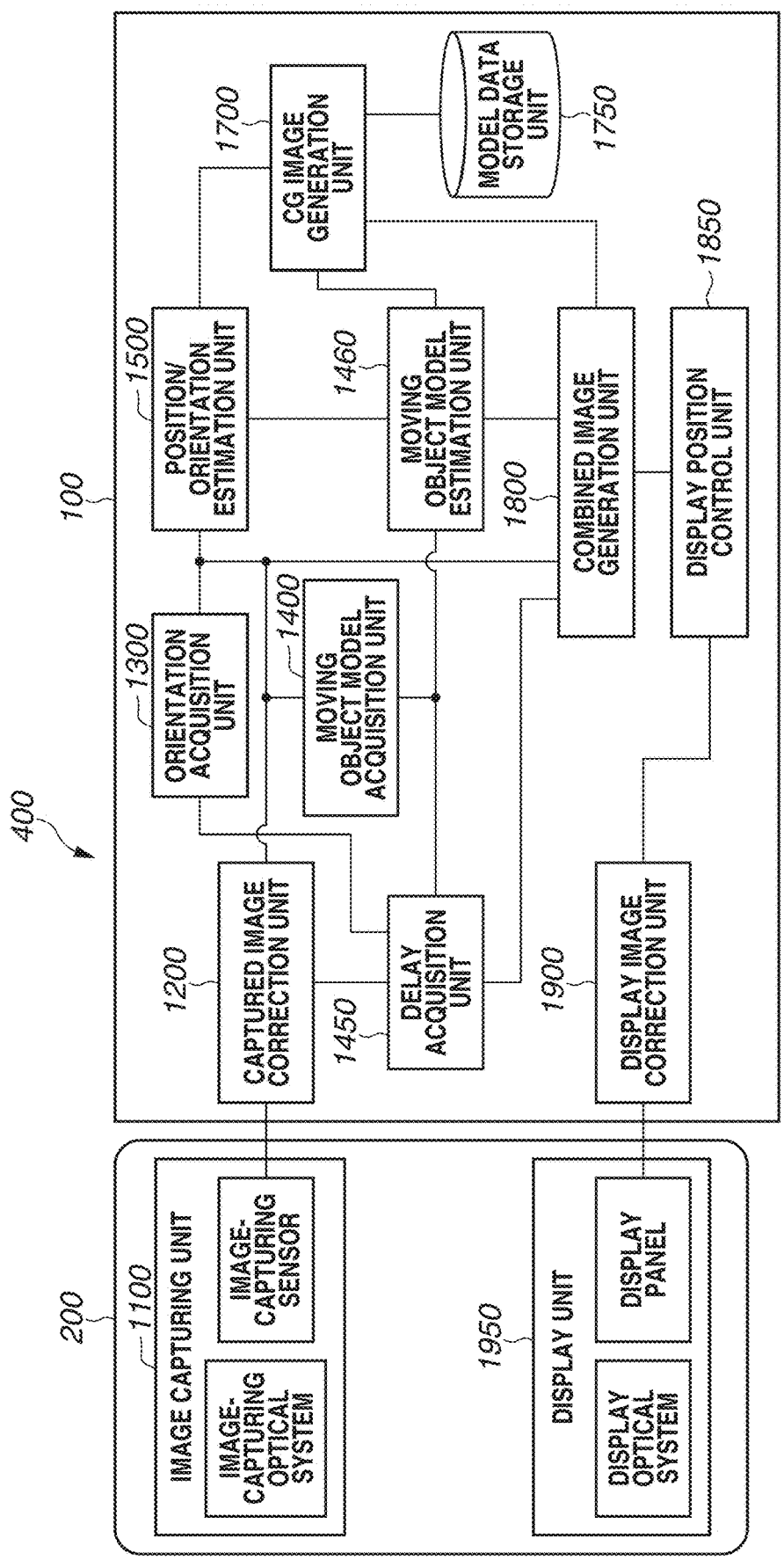
FIG. 4 is a block diagram illustrating a functional configuration example of an information processing system.

FIG. 4 is a block diagram illustrating a functional configuration example of an information processing system 400 according to the present exemplary embodiment. Now, functional blocks will be described. The information processing system 400 includes an HMD 200 and an information processing apparatus 100 that generates an image to be displayed on the HMD 200. The HMD 200 includes an image capturing unit 1100 and a display unit 1950. As a method for establishing a communication between the HMD 200 and the information processing apparatus 100, a universal serial bus (USB), IEEE 1394, and a local area network (LAN) can be selected, for example. The communication method is not limited to a specific communication method. The information processing apparatus 100 may be included in the HMD 200.

The image capturing unit 1100 is composed of at least an image capturing optical system and an image capturing sensor, and captures an image of a real space. In the present exemplary embodiment, the image capturing unit 1100 is a stereoscopic camera that is mounted in the HMD and captures images of the still object 120 and the moving object 110. The image capturing unit 1100 performs image capturing 60 times a second in this example. After completion of one image capturing operation, the image capturing unit 1100 transmits a captured image to a captured image correction unit 1200. The image capturing unit 1100 transmits the image and the image capturing time to the information processing apparatus 100 in such a manner that the image capturing time is associated with the image.

The display unit 1950 is composed of at least a display panel and a display optical system, and presents the image corrected by a display image correction unit 1900.

The captured image correction unit 1200 performs lens distortion correction processing on the image captured by the image capturing unit 1100. With the correction processing, a distortion of the image captured through a lens is corrected to thereby enhance the consistency with a CG image. The captured image correction unit 1200 transmits the corrected image to a combined image generation unit 1800 and transmits the image capturing time to a delay acquisition unit 1450.

An orientation acquisition unit 1300 is composed of a gyroscope sensor or an acceleration sensor, and acquires a result of measuring orientation information about the HMD. The orientation information indicates a result of measuring a relative movement of the HMD by the orientation sensor such as the gyroscope sensor. The orientation information acquired in this case is used for predicting the position of a specific object. As the orientation acquisition unit 1300, an orientation sensor that is capable of acquiring orientation data at 100 Hz or higher and has a little delay is preferably used. The orientation acquisition unit 1300 transmits the measured orientation information to each of the delay acquisition unit 1450 and the combined image generation unit 1800. The orientation acquisition unit 1300 transmits the measurement time of the latest orientation that can be currently measured to the delay acquisition unit 1450. Further, the orientation acquisition unit 1300 transmits the latest orientation information that can be currently measured to the combined image generation unit 1800. The orientation acquisition unit 1300 holds the orientation measurement time and the orientation measurement value in association with each other. Upon receiving the orientation measurement time, the orientation acquisition unit 1300 performs processing for returning the corresponding orientation measurement value.

The delay acquisition unit 1450 receives the image capturing time from the captured image correction unit 1200 and also receives a measurement time (first time) of the latest information, which can be currently measured, from the orientation acquisition unit 1300, and acquires a delay time as a difference between the image capturing time and a measurement time (second time) of the orientation acquisition unit. This delay time is presented to a moving object model estimation unit 1460 and is used for predicting a moving object model suitable for a time when both CG image generation processing and combining processing are completed. In order to predict the moving object model to be input to a CG image generation unit 1700, the delay acquisition unit 1450 needs to predict the time when the latest orientation to be acquired by a display position control unit 1850 is measured after the generation of the CG image is completed. However, at the time predicted by the moving object model estimation unit 1460, it is unknown how long (how many seconds) it takes for the CG image generation unit 1700 to perform image rendering processing, and it is also unknown what background image is to be generated based on which time of the orientation measurement value. In the present exemplary embodiment, the orientation measurement time to be predicted is, for example, an average value of delay times accumulated in five previous frames. The use of the average value of the delay times makes it possible to estimate the delay time in the current frame based on information about the previous frames. The delay time in the current frame is calculated in response to a notification about a timing when image combining processing is completed from the combined image generation unit 1800. More specifically, the difference between the image capturing time of the captured image used for the current frame and the orientation measurement time of the orientation acquisition unit 1300 used for generating a combined image is stored, and the average value of the delay times in five latest frames is held. This delay time is used for predicting a subsequent frame.

A position/orientation estimation unit 1500 estimates the position and orientation of the HMD to be used for superimposing the CG image so as to match the real space. The position/orientation information indicates the absolute three-dimensional position and orientation of the HMD in the real space. The position/orientation information is used for superimposing the CG image so as to match the real space. As a method for estimating the position and orientation, a method capable of observing the absolute position and orientation of the HMD in the real space is used. For example, with an optical sensor that measures the position and orientation by adding a plurality of markers to a measurement target, some example methods integrate pieces of information about the markers from a plurality of cameras installed on a ceiling or the like. A method of estimating the position and orientation by simultaneous localization and mapping (SLAM) can also be used. The SLAM is a technique for estimating three-dimensional position/orientation information about an image capturing apparatus in the real space by tracing features of a natural object, such as angular points included in a captured image, in each frame. Instead of using an optical sensor, the position/orientation of the HMD may be measured using markers, image features, or the like included in the image captured by the image capturing unit 1100 of the HMD. A CG image depicting a predetermined CG model at a predetermined position and orientation is generated using the position and orientation measured in this case. This configuration is required for creating a video image of a mixed reality.

Figure 9:
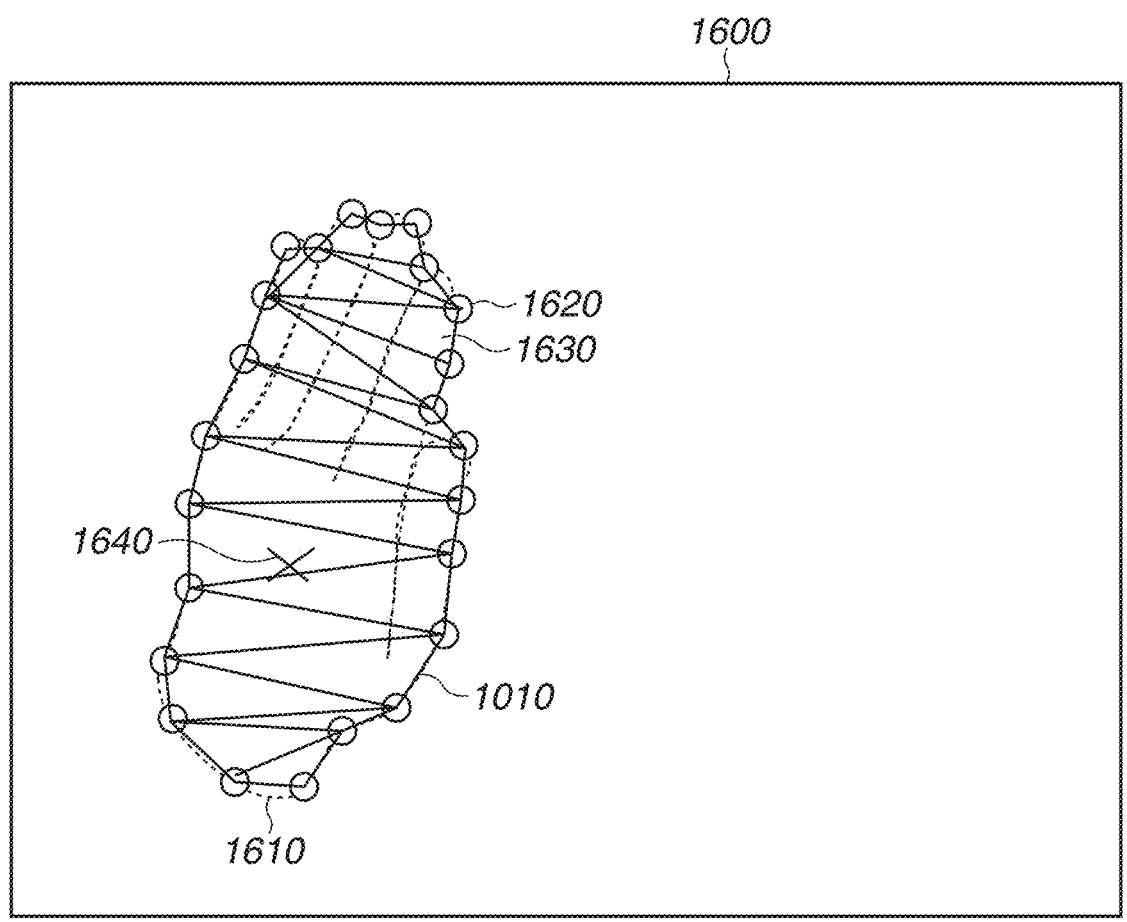
FIG. 9 illustrates an example of polygon information and a centroid position.

A moving object model acquisition unit 1400 acquires a moving object model (polygon) based on the result of measuring the three-dimensional shape of the moving object 110 included in the captured image. In the present exemplary embodiment, as an example of the moving object 110, a hand of the HMD wearer is exemplified as illustrated in FIG. 9. The moving object 110 according to the present exemplary embodiment is not limited to a hand of the HMD wearer. Some embodiments are applicable to any moving object, such as a hand of another HMD wearer, and a controller for measuring a motion, as long as the moving object 110 is an object that moves in a space. The measurement result of the detected moving object 110 is transmitted to the moving object model estimation unit 1460. In the present exemplary embodiment, as a method for measuring the hand of the HMD wearer, a method of estimating a shape by performing stereoscopic matching on the contour of a skin color area from the stereoscopic camera mounted in the HMD is used.

The moving object model estimation unit 1460 acquires the delay time calculated from previous information by the delay acquisition unit 1450, and predicts the position and shape of the moving object model at the time that matches the combined image obtained after the CG image is generated. The position and shape obtained by prediction are transmitted to the CG image generation unit 1700 and are rendered together with model data. A method for predicting the moving object model will be described below.

A model data storage unit 1750 is a storage unit that stores data on a three-dimensional CG model for generating a CG image to be displayed in the real space or the virtual space. The model data storage unit 1750 is composed of a RAM, an external storage device, or the like.

The CG image generation unit 1700 generates a CG image based on data on a three-dimensional CG model required for generating the CG image obtained from the model data storage unit 1750, the position and orientation of the HMD obtained by the position/orientation estimation unit 1500, and the position and shape of the moving object model. The generated CG image is output to the combined image generation unit 1800. Referring to FIG. 2D, the moving object 110 is represented by depicting the moving object model at the predicted position. On the other hand, the object 130 illustrated in FIG. 2D is a CG depicted based on CG model data. The object 130 is positioned based on the position/orientation information in the space acquired from the position/orientation estimation unit 1500 so that the object 130 is displayed on the object 120 that is present in the real space.

The combined image generation unit 1800 generates a combined image (second image) by combining a captured image and a CG image depicting a specific object at a position based on an estimation result in the captured image, based on the result of estimating the position of the specific object included in the captured image (first image). Assume that the specific object is a hand of the HMD wearer. Further, the combined image generation unit 1800 transmits the generated image to the display image correction unit 1900. The combined image generation unit 1800 receives the CG image from the CG image generation unit 1700, and combines the received CG image with the captured image received from the captured image correction unit 1200.

Figure 5:
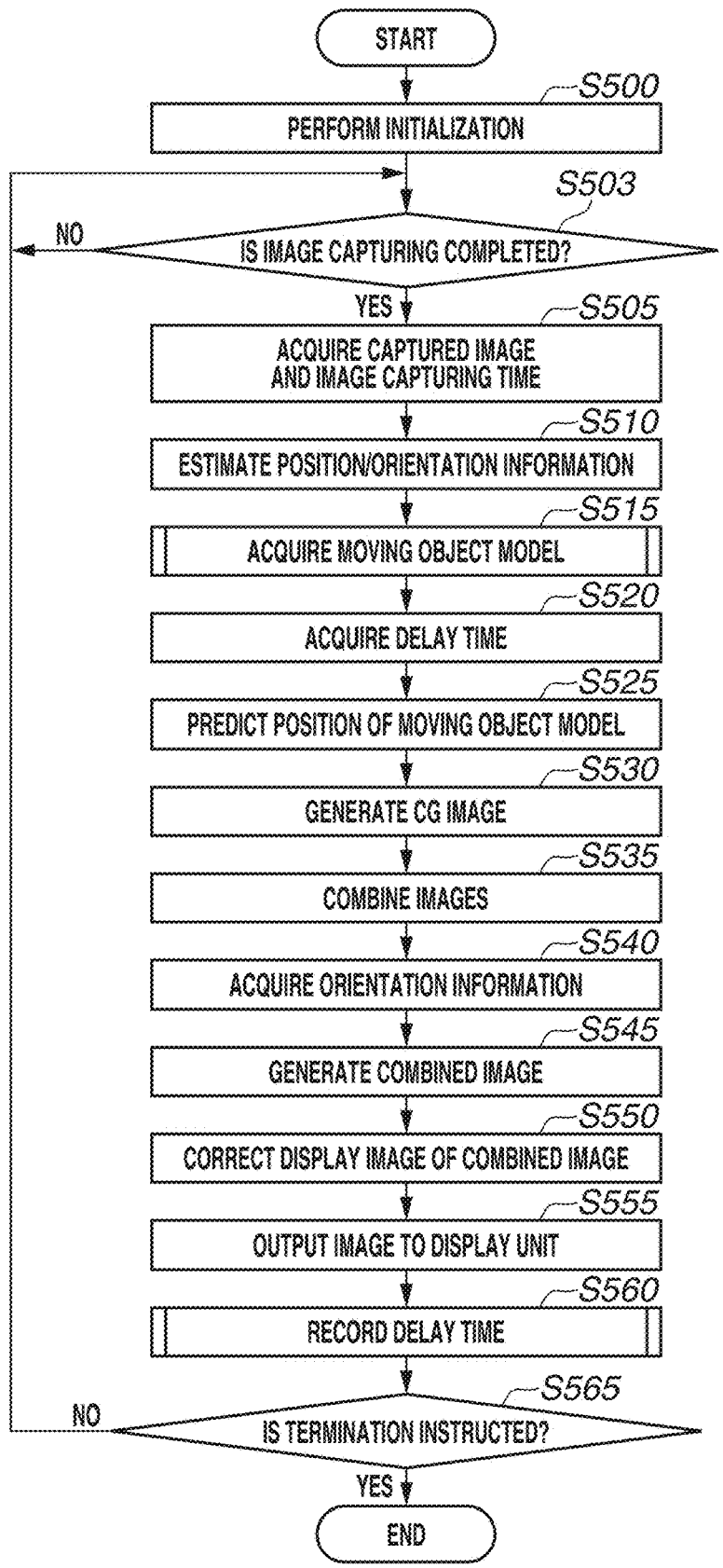
FIG. 5 is a flowchart illustrating processing to be executed by the information processing apparatus.

The combined image generation unit 1800 shifts the combined image generated in S535 illustrated in FIG. 5 based on a delay time caused by a processing time for at least a part of processing from the image capturing to the display, and a change (e.g., AO illustrated in FIG. 1B) in the orientation measured by the orientation acquisition unit 1300 in S540 illustrated in FIG. 5. Since the combined image is an image obtained before the CG image is generated, if the image is directly presented to the user, the user may feel a delay. To reduce the feeling of delay, the combined image generation unit 1800 measures the orientation of the HMD at a timing close to the timing at which the image combining processing is completed, and shifts the combined image of the captured image and the CG image based on the orientation information.

The display image correction unit 1900 corrects the combined image generated by the combined image generation unit 1800 based on a lens distortion in the display optical system of the HMD, and transmits the corrected image to the display unit 1950.

FIG. 5 is a flowchart illustrating details of processing to be executed by the information processing apparatus according to the present exemplary embodiment. Each flowchart to be described below is implemented by the CPU 901 executing a control program. However, the information processing apparatus need not necessarily perform all operations described in the flowchart.

An outline of processing according to the present exemplary embodiment will be described with reference to FIG. 5. In S500, the information processing apparatus 100 performs initialization. In S503, the image capturing unit 1100 determines whether image capturing processing for obtaining a captured image (first image) by capturing an image of a specific object in the real space is completed. The image 2000 illustrated in FIG. 2 corresponds to the captured image (first image). If the captured image has become available (YES in S503), the processing proceeds to S505. If the image capturing is not completed (NO in S503), the processing returns to S503 again to wait for completion of image capturing.

In S505, the captured image correction unit 1200 acquires the captured image (first image), which is obtained by capturing an image of the real space, and the image capturing time. The image 2000 illustrated in FIG. 2 corresponds to the captured image. In S510, the position/orientation estimation unit 1500 estimates position/orientation information for matching the absolute position of the HMD in the space based on the captured image. In S515, the moving object model acquisition unit 1400 acquires the result of measuring the three-dimensional shape of the moving object 110 from the captured image, and acquires a moving object model (polygon) representing the three-dimensional position or shape of the moving object. The image 2020 illustrated in FIG. 2 includes the moving object model 111 obtained as a result of extracting the moving object 110 from the image 2000. In S520, the moving object model estimation unit 1460 acquires, from the delay acquisition unit 1450, the time (first time) when the image is captured. In S525, the moving object model estimation unit 1460 acquires, from the moving object model acquisition unit 1400, the position of the moving object 110 and the moving object model 111 indicating a three-dimensional shape, and estimates at least one of the position and the three-dimensional shape of the moving object 110 after a predetermined period. The predetermined period is a difference between the time (first time) when an image is captured and the time (second time) when the position or orientation of the HMD is measured. In S530, the CG image generation unit 1700 generates a CG image obtained by depicting CG model data on the still object 120, which is preliminarily read at a predetermined position, and a moving object model predicted by the moving object model estimation unit 1460, based on the position/orientation information about the HMD. In this case, the moving object model is depicted so as to match the position in the real space based on the position/orientation information about the HMD obtained in S510. In S535, the combined image generation unit 1800 generates the second image by superimposing the image corresponding to the object at a position based on the estimation result in the first image based on the result of estimating the position of the specific object included in the first image after the predetermined period. FIG. 2D illustrates the image 2030 obtained by depicting the moving object model 111 in the image 2000 (first image) at the position predicted by the moving object model estimation unit 1460. More specifically, the combined image (second image), in which the captured image (first image) is used as a background image and the CG image is used as a foreground image, is generated. In S540, the combined image generation unit 1800 acquires the latest orientation information about the HMD measured by the orientation acquisition unit 1300. In S545, the display position control unit 1850 shifts the position at which the combined image (second image) to be supplied to the display unit is displayed based on a delay time caused by a processing time of at least a part of processing from the image capturing to the display, and an amount of change in the position or orientation of the image display apparatus. The image 2040 illustrated in FIG. 2E indicates a state where the image 2030 is shifted by ΔX. In S550, the display image correction unit 1900 converts the combined image generated in S545 into an image suitable for the display optical system. In S565, the captured image correction unit 1200 determines whether a termination instruction is made by the user. If the termination instruction is made (YES in S565), the processing is terminated. If the termination instruction is not made (NO in S565), the processing returns to S503.

The processing according to the present exemplary embodiment will be described in more detail below with reference to FIG. 5.

In S500, the information processing apparatus 100 performs initialization. More specifically, the CG image generation unit 1700 reads data indicating the three-dimensional CG model from the model data storage unit 1750. The read three-dimensional CG model data is used when the three-dimensional CG image generated in S530 is depicted at a predetermined position.

In S503, the image capturing unit 1100 determines whether the generation of the captured image is completed. If the captured image has become available (YES in S503), the processing proceeds to S505. If the image capturing is not completed (NO in S503), the processing returns to S503 again to wait for completion of image capturing.

In S505, the captured image correction unit 1200 acquires the captured image and the image capturing time. Assume herein that the image capturing time is represented by "t". Also assume that the image capturing unit is a stereoscopic camera and the image to be obtained is a stereoscopic image.

In S510, the position/orientation estimation unit 1500 acquires, from the optical sensor, at least orientation information in the position/orientation information about the HMD. The orientation information is not limited to information obtained from the optical sensor, but instead may be information obtained by using a combination of a gyroscope sensor, an acceleration sensor, an angular acceleration sensor, and the like, as needed. A three-dimensional motion of the head of the user may be detected using a motion sensor using a combination of at least one of a triaxial geomagnetic sensor, a triaxial acceleration sensor, and a triaxial gyroscope (angular velocity) sensor.

In S515, the moving object model acquisition unit 1400 extracts the area of the moving object 110 from the captured image, and estimates the shape of the moving object 110. This processing will be described in detail below.

In S520, the moving object model estimation unit 1460 acquires the delay time from the delay acquisition unit 1450.

In S525, the moving object model estimation unit 1460 acquires the position and a three-dimensional shape of the moving object 110 from the position/orientation estimation unit 1500, and estimates the position and three-dimensional shape of the moving object 110 based on the delay time acquired in S520. This processing will be described in detail below.

In S530, the CG image generation unit 1700 depicts the preliminarily read CG model data on the object 130 in the virtual reality and polygon information about the moving model predicted by the moving object model estimation unit 1460 based on the position/orientation information about the HMD. In this case, the moving object model is depicted so as to match the position in the real space based on the position/orientation information about the HMD obtained in S510. The CG image generation unit 1700 depicts the object 130 so as to correspond to the predetermined position in the real space based on the model data.

In S535, the combined image generation unit 1800 combines the captured image with the CG image. The combining processing is performed in such a manner that the captured image is used as a background image and the CG image is used as a foreground image.

In S540, the combined image generation unit 1800 acquires the latest orientation information about the HMD measured by the orientation acquisition unit 1300.

In S545, the display position control unit 1850 shifts the position at which the combined image (second image) to be supplied to the display unit is displayed based on the delay time caused by the processing time of at least a part of processing from the image capturing to the display, and the amount of change in the position or orientation of the image display apparatus. In other words, like in the method discussed in Japanese Patent Application Laid-Open No. 2004-109994, the combined image generation unit 1800 acquires, from the orientation acquisition unit 1300, the orientation measurement value at a time close to the image capturing time, and obtains the difference in orientation between the acquired orientation measurement value and the latest orientation measurement value. Further, this difference in orientation may be converted into an image shift amount in the vertical direction and an image shift amount in the horizontal direction on the combined image, and the combined image may be shifted based on the shift amount.

In S550, the display image correction unit 1900 converts the combined image generated in S545 into an image suitable for the display optical system. In the present exemplary embodiment, an opposite distortion may be added to the combined image so as to cancel the preliminarily measured distortion of the lens used for the display optical system.

In S555, the display position control unit 1850 shifts the position at which the combined image (second image) to be supplied to the display unit is displayed based on the delay time caused by the processing time of at least a part of the processing from the image capturing to the display, and the amount of change in the position or orientation of the image display apparatus. Under this control, the display unit 1950 displays the image generated in S550 on the display panel, and presents the video image to the HMD wearer through the display optical system.

In S560, the combined image generation unit 1800 requests the delay acquisition unit 1450 to calculate the delay time including the delay in the current frame so as to calculate the delay time used for the subsequent frame. The delay time calculation processing will be described in detail below.

In S565, the captured image correction unit 1200 determines whether a termination instruction is made by the user. If the termination instruction is made (YES in S565), the processing is terminated. If the termination instruction is not made (NO in S565), the processing returns to S503.

Figure 6:
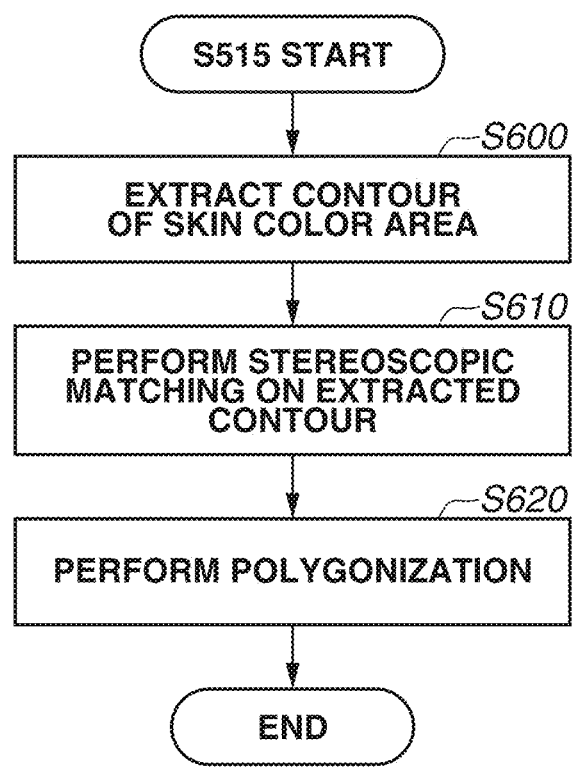
FIG. 6 is a flowchart illustrating processing to be executed by a moving object model acquisition unit.

FIG. 6 is a flowchart illustrating details of the processing of S515 to be performed by the moving object model acquisition unit 1400 according to the present exemplary embodiment. In this case, the area of the moving object is extracted from the captured image, and the moving object model is acquired by performing stereoscopic matching on the contour of the moving object.

In S600, the moving object model acquisition unit 1400 extracts a skin color area from the stereoscopic captured image. In the present exemplary embodiment, color information on all skin color areas obtained when the image of the skin color is captured in advance is recorded, and the color information is held in a table. In this case, the color information may be represented by three primary colors, i.e., red, green, and blue (RGB), or may be represented by luminance of YCbCr and tint information. Next, the moving object model acquisition unit 1400 determines the contour based on the extracted skin color areas.

In S610, the moving object model acquisition unit 1400 performs stereoscopic matching on the contour of the extracted moving object 110 by using stereoscopic images, and generates the three-dimensional contour of the moving object 110. In the generation of the three-dimensional contour, an epipolar line corresponding to a sampling point on the counter on a single image in the stereoscopic image is projected on another stereoscopic image, and a point where the epipolar line and the contour intersect with each other is set as a corresponding point. A plurality of sampling points is determined on the contour and a plurality of corresponding points is obtained on the contour. A depth image corresponding to the plurality of corresponding points on the contour is calculated by triangulation.

Figure 11A:
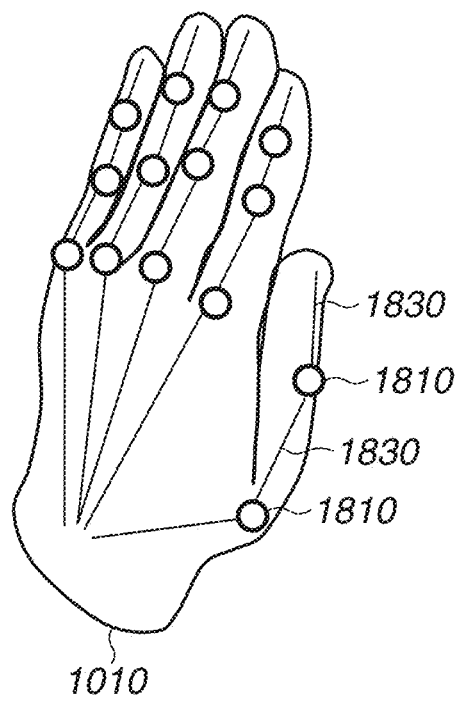
FIGS. 11A and 11B each illustrate an example of a change in a bone estimation result.
Figure 11B:
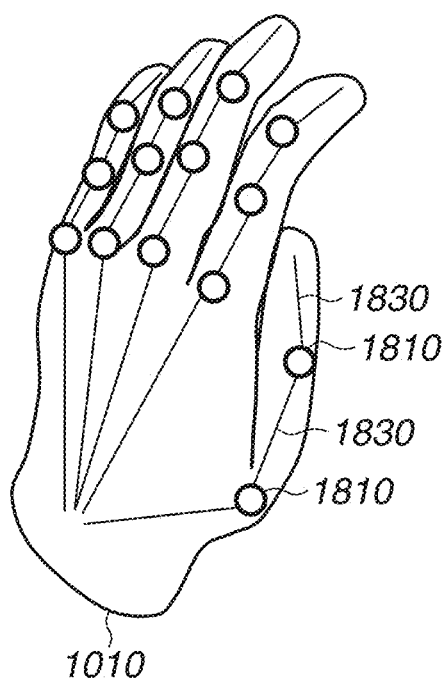

In S620, the moving object model acquisition unit 1400 acquires a polygon (moving object model) representing the shape of the moving object 110 based on the plurality of corresponding points obtained in S610. In the present exemplary embodiment, three corresponding points, which have a shorter distance therebetween and have a lower height (Y-coordinate value) above the image, may be selected from among the plurality of corresponding points, and the selected corresponding points may be connected to thereby make a polygon. In this case, however, a polygon generated in an area other than the skin color area extracted in S600 is discarded. This processing makes it possible to extract the hand as the moving object 110 from the captured image and generate polygon information in a three-dimensional space. FIGS. 11A and 11B are schematic diagrams each illustrating a polygon generated based on the corresponding points on the contour.

Figure 7:
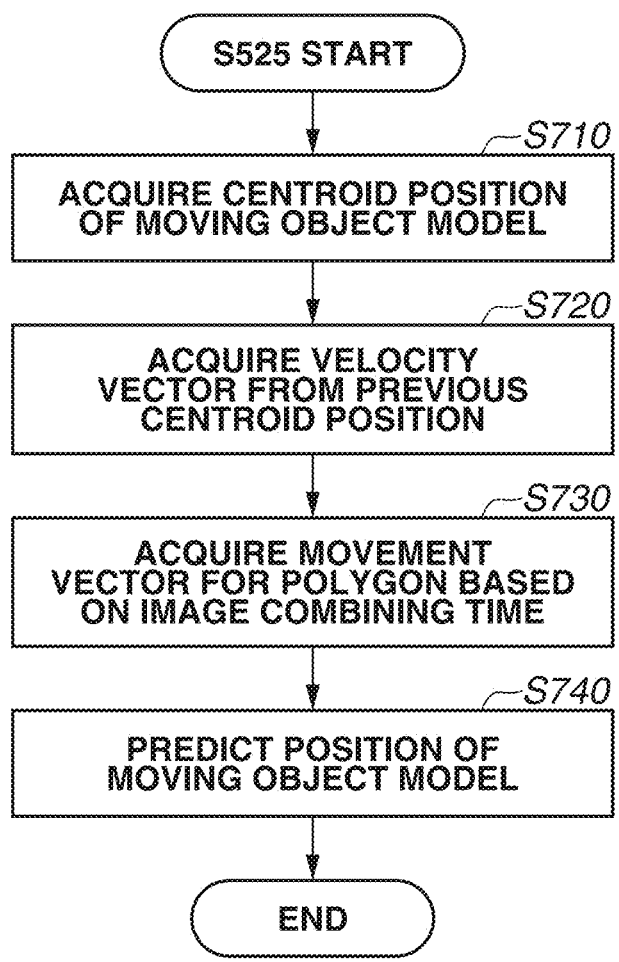
FIG. 7 is a flowchart illustrating processing to be executed by a moving object model estimation unit.

FIG. 7 is a flowchart illustrating details of the processing of S525 to be performed by the moving object model estimation unit 1460 according to the present exemplary embodiment.

In S710, the moving object model estimation unit 1460 acquires the centroid position of the polygon of the moving object 110 from the polygon information obtained by the moving object model acquisition unit 1400. The centroid position can be calculated by averaging the three-dimensional positions of the vertices of the polygon. FIG. 9 is a schematic diagram illustrating the position obtained when the centroid position of the polygon is calculated based on the polygon information. While FIG. 9 illustrates the position two-dimensionally for ease of illustration, the position is defined by three-dimensional points in data. The centroid position of the polygon is held in association with the image capturing time in a memory so that the centroid position of the polygon can be used in the subsequent frame. Various embodiments are not limited to the calculation of the centroid position of a polygon. Any method capable of determining representative positions for predicting the moving object 110 can be applied.

Figure 10:
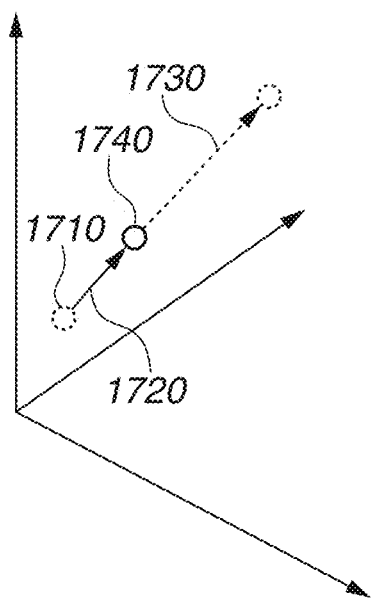
FIG. 10 is a schematic diagram illustrating a method for calculating a predicted movement vector.

In S720, the moving object model estimation unit 1460 reads out the polygon centroid position in the previous frame from the memory, and subtracts the polygon centroid position in the previous frame from the polygon centroid position in the current frame, thereby acquiring a motion vector 1720 in the space. FIG. 10 is a schematic diagram illustrating a positional relationship between a polygon centroid position 1740 in the current frame and a polygon centroid position 1710 in the previous frame. Further, an elapsed time T between frames is calculated based on the difference between the image capturing time of the current frame and the image capturing time of the previous frame, and the motion vector 1720 is divided by the elapsed time T, thereby obtaining a velocity vector E (not illustrated) per unit time.

In S730, the moving object model estimation unit 1460 multiplies the delay time acquired in S520 by the velocity vector E, thereby obtaining a predicted movement vector 1730 for moving the vertices of the entire polygon of the moving object 110.

In S740, the moving object model estimation unit 1460 estimates the position of the moving object by adding the predicted movement vector 1730 to all three-dimensional vertices of the polygon obtained by the moving object model acquisition unit 1400. The addition of the predicted movement vector 1730 makes it possible to generate the shape of the predicted moving object 110.

Figure 8:
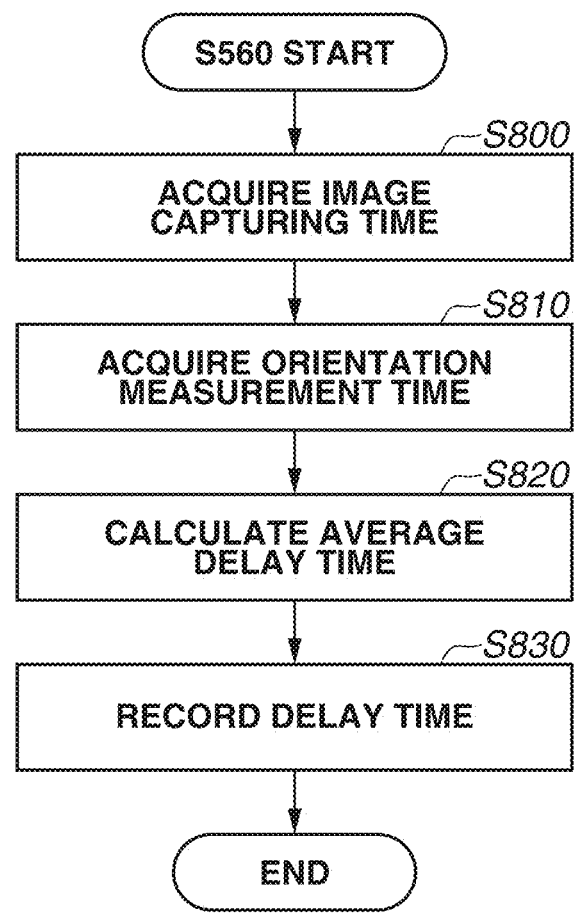
FIG. 8 is a flowchart illustrating processing to be executed by a delay acquisition unit.

FIG. 8 is a flowchart illustrating details of the processing of S560 to be performed by the delay acquisition unit 1450 according to the present exemplary embodiment. In S800, the delay acquisition unit 1450 acquires the image capturing time of the current frame.

In S810, the delay acquisition unit 1450 acquires, from the orientation acquisition unit 1300, the measurement time of the orientation used for predicting the moving object model.

In S820, the delay acquisition unit 1450 acquires the delay times in five previous frames from the memory, and calculates an average delay time by averaging the delay times including the delay time in the current frame.

In S830, the delay acquisition unit 1450 stores, in the memory, the average delay time calculated in S820, and the moving object model estimation unit 1460 uses the stored average delay time for predicting the moving object 110 in the subsequent frame.

As described above, it is possible to reduce a feeling of strangeness given to the user when a moving object is not displayed at a position at which the moving object is to be displayed when a rapid change occurs in the position/orientation of the HMD of the HMD wearer, even in a case where the moving object is present in a scene.

The present exemplary embodiment described above illustrates a method in which a combined image, obtained by combining a captured image with a CG image depicting a moving object model at a predicted position at which a moving object is present after a predetermined period, is shifted and displayed. In another embodiment, a captured image shifted based on a delay time is combined with a CG image depicting a moving object model at a predicted position at which the moving object is present after a predetermined period. In this case, between S530 and S535 in the flowchart illustrated in FIG. 5, the combined image generation unit 1800 performs conversion processing for shifting the captured image (first image) based on the delay time. The display position control unit 1850 controls the combined image obtained by combining the shifted captured image with the CG image depicted at the predicted position so that the combined image is directly displayed without changing the display position.

While the exemplary embodiments described above illustrate an example in which a hand is extracted as a specific object, any object may be held by the hand. In other words, the specific object may include a hand and an object held by the hand. An extraction unit extracts a specific object based on a skin color area extracted from the captured image of the real space and a feature set adjacent to the skin color area. For example, the image of the real space is captured in a state where the user holds a pen in the hand. The area of the hand is extracted from the skin color area. In this case, if a feature set that moves in conjunction with the hand area is present in a continuous area adjacent to the skin color area, it is determined that something is held by the hand. Then, the object is also extracted from the image. Alternatively, when the pen is recognized in segmentation (e.g., by deep learning), the area of the pen may be extracted based on a feature set representing the pen. Further, the extracted area of the pen is processed as the specific object described above so that the pen is displayed at the position at which the pen is to be displayed when a rapid change occurs in the position/orientation of the HMD.

Modified Example 1

In the first exemplary embodiment described above, the moving object model estimation unit 1460 moves the three-dimensional vertices in parallel by adding the predicted movement vector to the three-dimensional vertices of the hand detected by the moving object model acquisition unit 1400, to thereby generate a predicted shape.

However, some embodiments are not limited to the method of predicting only the position by a parallel movement as described above. Alternatively, an angle of a finger may be predicted. A modified example illustrates a method for enhancing the accuracy of predicting the shape of the hand by predicting the angle of each finger.

To implement Modified Example 1, the configuration according to the first exemplary embodiment is modified as follows.

The moving object model acquisition unit 1400 obtains the three-dimensional shape of the contour by stereoscopic matching from the stereoscopic camera mounted in the HMD, and then performs bone estimation on the fingers of the hand that matches the three-dimensional shape of the hand.

For example, the technique of Chen Qian may be used for the bone estimation including the fingers of the hand. Specifically, a depth image with respect to a viewpoint is generated based on the hand polygon information obtained in S620, and a plurality of spheres that match the depth image is set. Next, the bone of each finger in the current frame is estimated with reference to the position of each sphere and the bone shape of the hand in the previous frames. FIG. 11A is a schematic diagram illustrating the bone estimation result. FIG. 11A illustrates a state where two bones are connected to one joint.

An angle at each joint of five fingers is obtained from the estimated bone of each finger of the hand. FIG. 11A illustrates an angle formed between two bones at one joint. For example, as illustrated in FIG. 11A, two points (points 1810) in the thumb and three points in each of the other fingers, i.e., the index finger to the little finger, may be set as joint portions. The angle of each joint may be calculated by, for example, calculating the inner product of vectors for two bones and substituting the inner product value into an arccosine function. In this case, assume that the length of each of the vectors for the two bones is "1". For example, the vector for the thumb is represented by 1830.

Figure 12A:
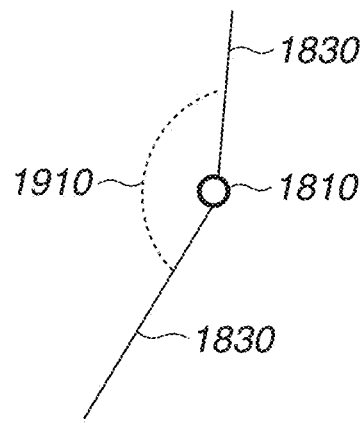
FIGS. 12A, 12B, and 12C each illustrate an example of a change in joint angle and a predicted joint angle.
Figure 12B:
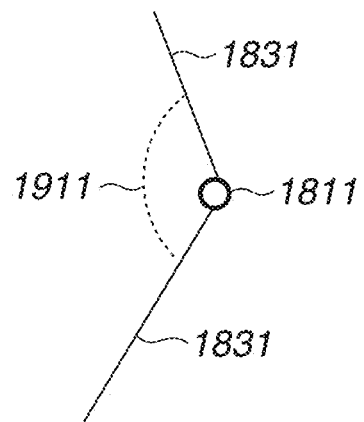
Figure 12C:
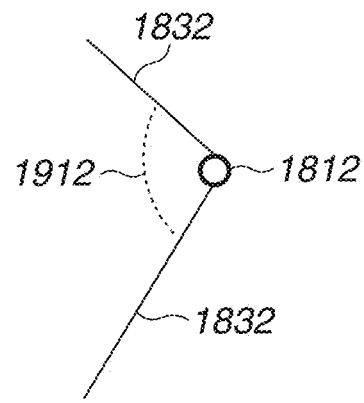

Next, in addition to the processing of calculating the predicted movement vector and moving the position by a parallel movement, the moving object model estimation unit 1460 according to Modified Example 1 predicts the angle of each finger that matches the combined image obtained after the CG image is generated, based on the difference between the joint angle obtained from the bone estimation result and the predicted joint angle in the previous frame. For example, a difference angle between the joint angle in the current frame and the joint angle in the previous frame may be calculated to obtain the predicted joint angle on the premise that a constant angular velocity motion is made in the same rotation direction. Assuming that FIG. 12A illustrates the joint angle in the previous frame and FIG. 12B illustrates the joint angle in the current frame, the predicted joint angle as illustrated in FIG. 12C is obtained. The method of obtaining the predicted joint angle is not limited to the method using the difference between the angle in the previous frame and the angle in the current frame so as to obtain the angle at each joint of the five fingers. The angle at each joint of the five fingers may be obtained by machine learning. For example, an image obtained by capturing an image of an actual motion of the hand is applied to the technique of Chen Qian described above, and the time-series angles at the joints of the five fingers are input as data for learning. Time-series transitions of the angles at the joints of the five fingers may be accumulated from the data for learning, and the joint angles in the current frame may be predicted from the input time-series data on the joint angles in the previous frames.

Further, the moving object model estimation unit 1460 moves each polygon vertex using the predicted angle of each finger. Each polygon vertex may be moved in such a manner that a point K that is closest to the polygon vertex obtained before movement on the corresponding bone before movement is obtained, and a motion vector of the point K on the bone after movement is added to the polygon vertex obtained before movement.

Different portions in the processing according to Modified Example 1 will be described below.

In the polygonization processing of S620, the moving object model acquisition unit 1400 may perform bone estimation using a known technique after the processing of generating a polygon.

In the motion vector calculation of S730, the moving object model estimation unit 1460 may calculate the movement of the centroid position before performing the processing of predicting the joint angle described above, and may update the orientation of the bone from the predicted angle and further update the position of the polygon.

As described above, according to Modified Example 1, a more highly accurate prediction can be applied to a variable portion of a moving object not only by predicting the position, but also by predicting the joint angle.

Modified Example 2

Figure 13A:
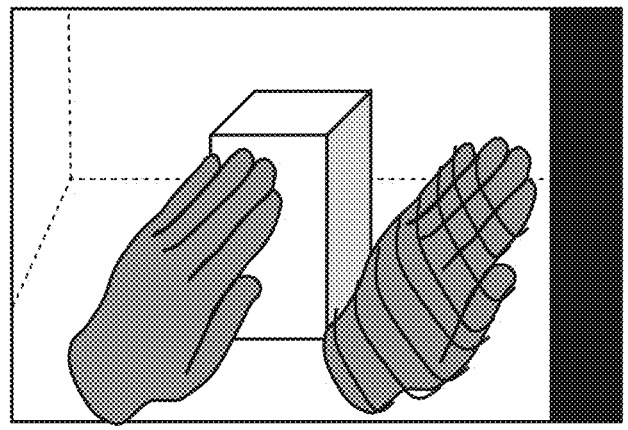
FIGS. 13A, 13B, and 13C each illustrate an example of image processing to be performed on a moving object included in a captured image.

In the first exemplary embodiment, the predicted shape of the moving object 110 is generated and the combined image obtained by combining the predicted shape with the predicted captured image is presented, but the image of the moving object 110 included in the captured image is directly presented. As illustrated in FIG. 13A, both the moving object model 111 of the predicted moving object and the moving object 110 are presented to the HMD wearer, so that the HMD wearer that recognizes the moving object 110 may get confused.

In Modified Example 2, processing is described in which image processing is performed on the moving object 110 included in the captured image to make the image less noticeable so that the HMD wearer can more easily recognize the moving object model 111 based on which the moving object 110 is predicted.

The configuration and processing for implementing Modified Example 2 may be modified as follows.

In S545, the combined image generation unit 1800 determines the area of the moving object from the contour of the captured image extracted in S600, and performs predetermined image processing on the area of the moving object.

Figure 13B:
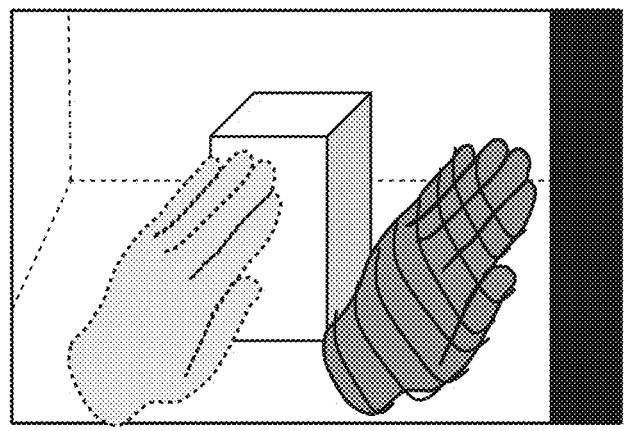
Figure 13C:
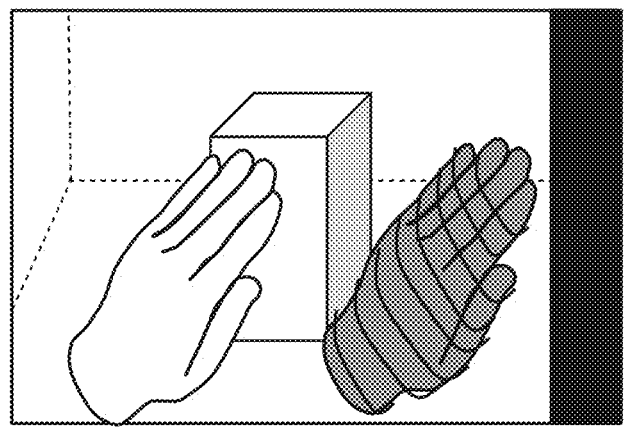

FIGS. 13A, 13B, and 13C illustrate examples of the image processing. FIG. 13B illustrates a display image to be displayed when blurring processing on pixels included in the area of the moving object is performed by using a Gaussian filter or the like. FIG. 13C illustrates a display image to be displayed when a representative color adjacent to the area of the moving object is determined and processing of painting the area is performed. In addition, for example, processing for converting the color of each pixel in the area into a grayscale may be used. In other words, the skin color area in the captured image (first image) is complemented with a predetermined color (white or black). Alternatively, transparently processing may be performed on the moving object area. A combination of a plurality of types of image processing can be applied.

The application of Modified Example 2 as described above enables the HMD wearer to concentrate on the three-dimensional model 111, which is the predicted shape of the moving object, by making the image of the moving object 110 less recognizable by the HMD wearer. This leads to a reduction in a feeling of strangeness given to the HMD wearer.

In the first exemplary embodiment, the HMD that presents an image of a mixed reality is described. However, some embodiments also applicable to the HMD that presents an image of a virtual reality. The HMD that presents an image of a virtual reality differs from the HMD that presents an image of a mixed reality in that the HMD that presents an image of a virtual reality does not include an image capturing apparatus and displays all video images as CG video images. A virtual reality system is capable of displaying an image of a virtual reality also in the black areas illustrated in FIGS. 1 and 2.

In the first exemplary embodiment, an example is described in which the area of the hand is extracted from the image captured by the camera so as to recognize the position of the hand of the user, and then the current position of the hand, which is a moving object, is predicted and presented. However, some embodiments are not limited to the example in which the area of the hand extracted from the image captured by the camera is predicted. For example, a game controller or the like whose position and orientation in the three-dimensional space are measured may be treated as the moving object, and the current position of the game controller may be predicted and presented.

In a second exemplary embodiment, a description is given of a method for reducing a feeling of strangeness caused when a moving object is not displayed at a position at which the moving object is to be displayed, in a case of reducing a feeling of delay in the HMD that presents an image of a virtual reality, assuming that a game controller is treated as a moving object.

Figure 14:
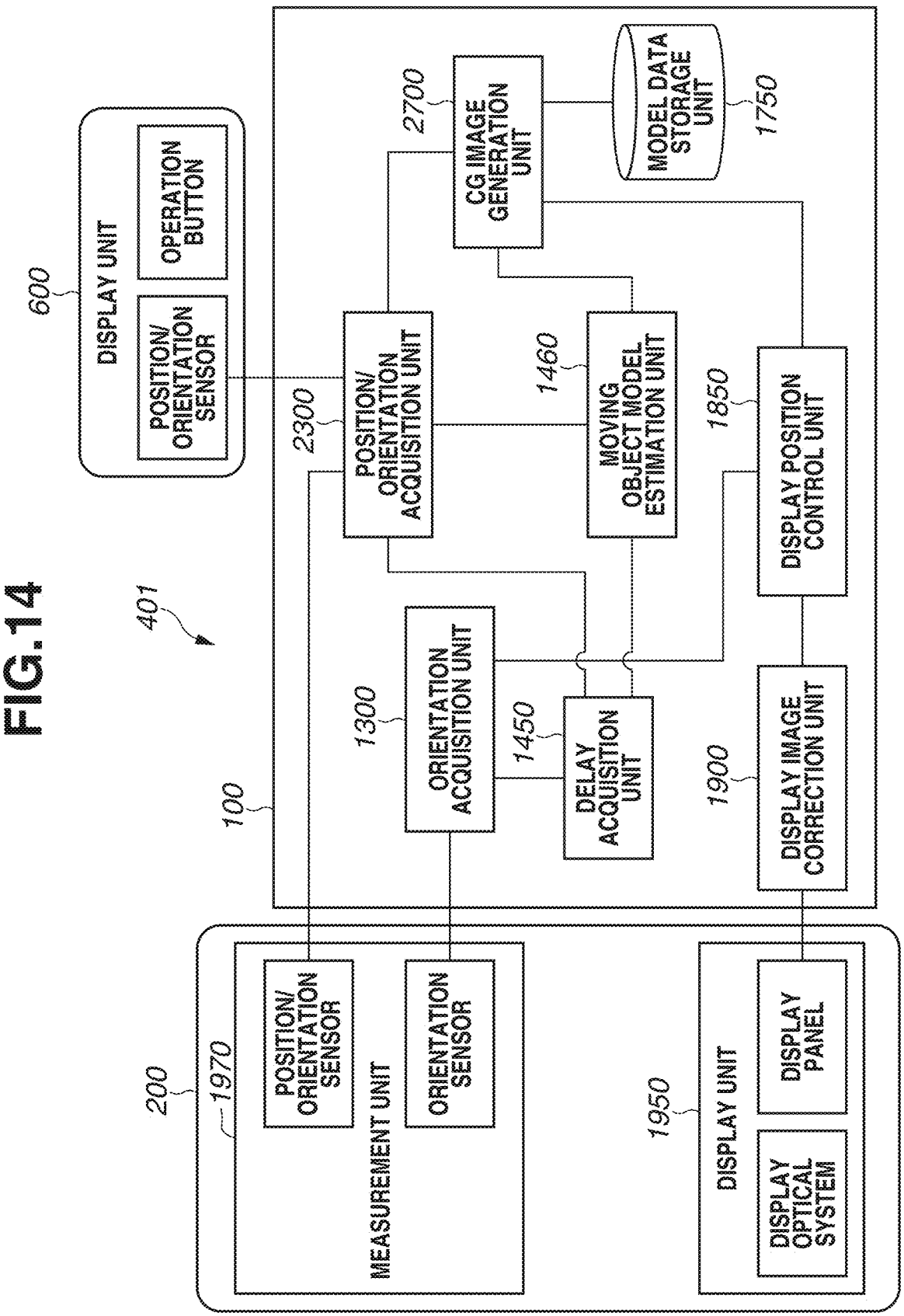
FIG. 14 is a block diagram illustrating a functional configuration example of the information processing system.

FIG. 14 is a block diagram illustrating a functional configuration example of an information processing system 401 according to the present exemplary embodiment. To implement the present exemplary embodiment, the configuration according to the first exemplary embodiment is modified as follows. Descriptions of the same components as those in the first exemplary embodiment will be omitted.

A measurement unit 1970 for measuring the position and orientation of the HMD is added to the configuration of the HMD 200. The measurement unit 1970 is composed of a position/orientation sensor or an orientation sensor.

Further, a game controller 600 is added to the configuration. In the present exemplary embodiment, the user holds the game controller 600 in the user's hand, and the position of the hand of the user in the virtual space is displayed as a moving object CG model. The moving object CG model to be displayed at the position/orientation of the game controller 600 may be a CG model that represents the shape of the hand holding the game controller 600. The game controller 600 is composed of a sensor that measures the position/orientation of the game controller 600 itself, and an operation button for operating the CG model, which is an operation target to be arranged in the virtual space.

In a virtual space system, a CG image of the virtual space is generated. The generation of the CG image is started at a certain time "t". The CG image of the virtual reality space based on the position/orientation information about the HMD measured immediately before the time "t" is referred to as a first CG image. In a case where the orientation of the HMD and the orientation of the game controller 600 are changed during a period (delay time) between the time "t" and the time when the image based on the first CG image is displayed, a feeling of strangeness may occur when the first CG image is displayed directly. The image obtained by predicting the position of the moving object based on the delay time and rendering the moving object is referred to as a second CG image. A third CG image is a CG image obtained by predicting the amount of movement of the game controller 600 during a period in which the CG image is generated, and depicting the moving object model corresponding to the game controller 600.

A CG image generation unit 2700 generates the first CG image (third image) by rendering a CG model stored in the model data storage unit 1750 based on the position/orientation information about the HMD obtained from a position/orientation acquisition unit 2300. Further, the second CG image (fourth image) is generated by rendering the CG model of the moving object on the first CG image at the predicted position estimated by the moving object model estimation unit 1460. Also, a combined image (fourth image) obtained by combining the first CG image (third image) with the third CG image obtained by rendering the moving object model based on the predicted position and shape may be generated. In this case, the CG model of the moving object is rendered after the position and shape estimated by the moving object model estimation unit 1460 are input and reflected in the three-dimensional space. In this case, the CG model of the moving object is rendered based on the three-dimensional position and shape corresponding to the orientation measurement time by taking into consideration that the CG model is corrected in image shift processing to be executed by the display position control unit 1850 after rendering. In other words, a CG model of an object other than a moving object is rendered based on the position/orientation measurement time, and the CG model of the moving object is rendered based on the orientation measurement time.

The orientation acquisition unit 1300 acquires, from the orientation sensor of the measurement unit 1970 of the HMD 200, the current orientation information about the HMD 200 that is measured immediately before the second CG image generated by the CG image generation unit 2700 is displayed. The orientation information includes the orientation of the HMD 200 and the orientation measurement time. The orientation measurement time outputs the orientation information to each of the delay acquisition unit 1450 and the display position control unit 1850. A sensor having a higher speed (e.g., 180 Hz) than other position/orientation sensors may be used as the orientation sensor of the measurement unit 1970 to acquire the orientation information.

The position/orientation acquisition unit 2300 acquires the position/orientation information about the HMD 200, which is measured immediately before the CG image generation unit 2700 generates the first CG image (third image), from the position/orientation sensor of the measurement unit 1970 of the HMD 200. The acquired position/orientation information about the HMD 200 is output to the CG image generation unit 2700. Further, the position/orientation acquisition unit 2300 acquires, from the position/orientation sensor of the game controller 600, the position/orientation information about the game controller 600 that is measured immediately before the CG image generation unit 2700 generates the first CG image (third image). The position/orientation information about the game controller 600 (moving object) is used for predicting the position of the moving object. The position/orientation information to be measured in this case is represented in a coordinate system in the virtual reality space.

The delay acquisition unit 1450 calculates the delay time required for predicting the moving object based on the latest orientation measurement time from the orientation acquisition unit 1300 and the latest position/orientation measurement time from the position/orientation acquisition unit 2300. In the present exemplary embodiment, the delay time is a difference between the position/orientation measurement time (third time) measured by the position/orientation acquisition unit 2300 immediately before the generation of the first CG image is started and the time (fourth time) measured by the orientation acquisition unit 1300 immediately before the second CG image is displayed. The second exemplary embodiment differs from the first exemplary embodiment in that the position/orientation measurement time is used to calculate the delay time, instead of using the image capturing time. In a case where the CG image generation unit 2700 renders a CG model of an object other than a moving object, the CG model is rendered using the position/orientation of the HMD 200, and a video image to be generated is a video image obtained at the position/orientation measurement time. Accordingly, the difference between the orientation measurement time to be referred to in image shift correction processing and the position/orientation measurement time is the delay time to be corrected. The delay acquisition unit 1450 needs to predict the orientation measurement time so as to predict the moving object model to be input to the CG image generation unit 2700. However, at the time when the moving object model estimation unit 1460 predicts the moving object model, it is unknown which orientation measurement value obtained at which time is used to generate the CG image. In the present exemplary embodiment, an average value of the values of delay times of the orientation measurement time and the position/orientation measurement time accumulated in five previous frames may be used. The use of the average value of delay times makes it possible to estimate the delay time in the current frame based on the information in the previous frames.

The moving object model estimation unit 1460 acquires the delay time calculated by the delay acquisition unit 1450 based on the previous information, and predicts the position and shape of the moving object model at the orientation measurement time. The position and shape obtained by prediction are transmitted to the CG image generation unit 2700, and the CG model of the moving object is rendered together with other model data.

The display position control unit 1850 shifts the position at which the second CG image (fourth image) to be supplied to the display unit is displayed based on a delay time (a difference between the position/orientation measurement time and the orientation measurement time) and an amount of change in orientation (an amount of change in the orientation value at the position/orientation measurement time and an amount of change in the current orientation value).

Figure 15:
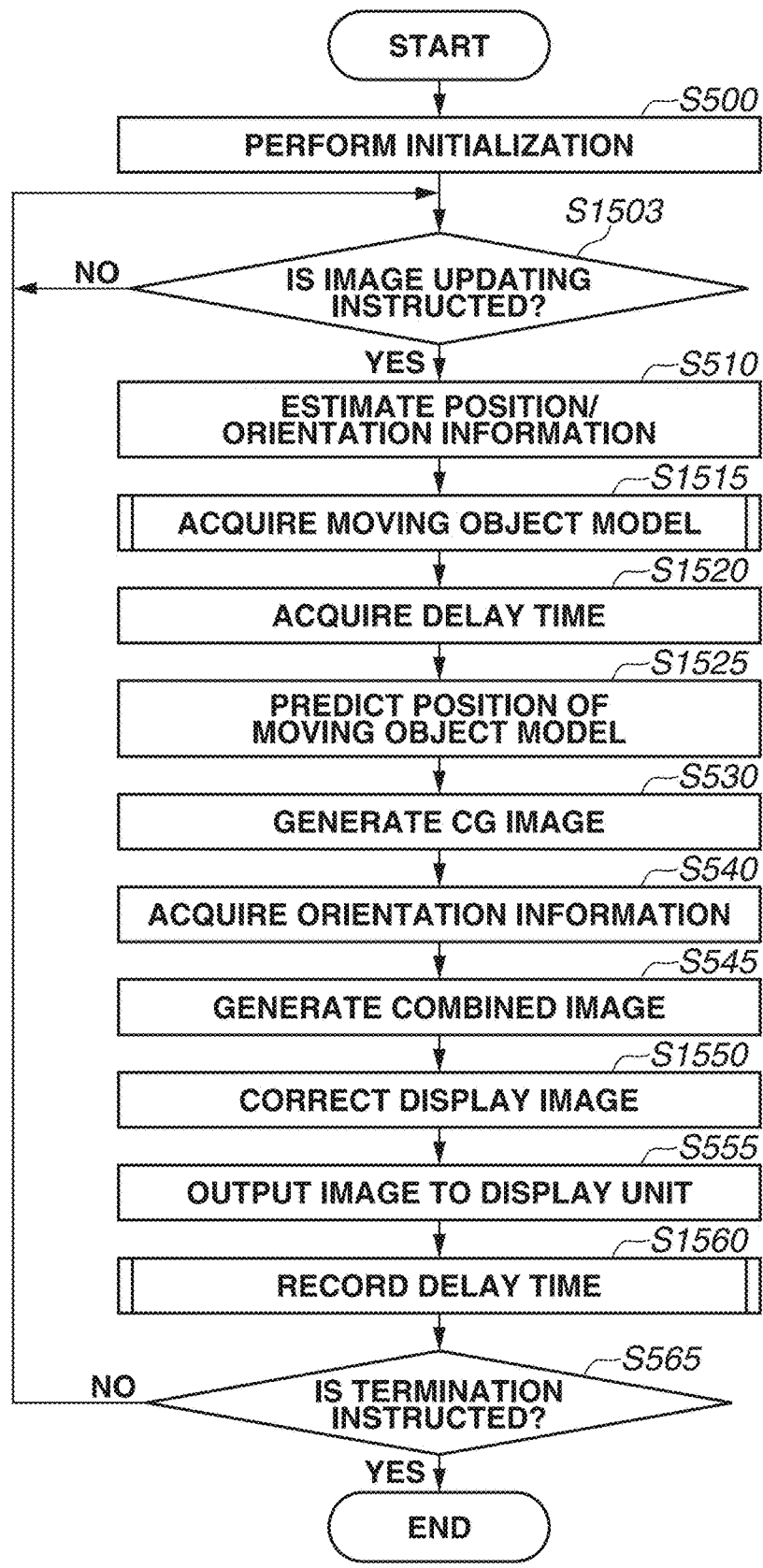
FIG. 15 is a flowchart illustrating processing to be executed by the information processing apparatus.

FIG. 15 is a flowchart illustrating details of processing to be executed by the information processing apparatus according to the present exemplary embodiment.

To implement the present exemplary embodiment, the processing according to the first exemplary embodiment is modified as follows. Descriptions of the same processing as that in the first exemplary embodiment will be omitted.

In S1503, the CG image generation unit 2700 determines whether to start the generation of the CG image at a predetermined interval of outputting the image to the HMD 200. For example, a display interval of a general display is 60 Hz. Accordingly, an instruction to start the generation of the CG image 60 times a second is made.

From S1515 to S1525, the moving object model estimation unit 1460 predicts the position and shape of the moving object model at the orientation measurement time based on the position/orientation of the game controller 600 and the delay time acquired by the delay acquisition unit 1450.

In S1550, the display position control unit 1850 shifts the position at which the combined image is displayed based on the delay time and the amount of change in orientation and controls the display of the display unit 1950.

In S1560, the display position control unit 1850 records and holds the delay time as a difference between the orientation measurement time and the position/orientation measurement time when the CG image is shifted.

As described above, applying various embodiments to the HMD that presents an image of a virtual reality makes it possible to reduce a feeling of strangeness caused when a moving object is not displayed at a position at which the moving object is to be displayed.

Some embodiments can also be implemented by processing in which a program for implementing one or more functions according to the exemplary embodiments described above is supplied to a system or apparatus via a network or storage medium, and one or more processors in a computer of the system or apparatus reads out the program and executes the program. Some embodiments can also be implemented by a circuit (e.g., an application specific integrated circuit (ASIC)) that implements one or more functions according to the exemplary embodiments described above.

OTHER EMBODIMENTS

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that not all embodiments are limited to the disclosed exemplary embodiments. The scope of the following claims is to be accorded the broadest interpretation so as to encompass all such modifications and equivalent structures and functions.

This application claims priority to Japanese Patent Application No. 2018-205859, which was filed on Oct. 31, 2018 and which is hereby incorporated by reference herein in its entirety.

What is claimed is:

1. An information processing apparatus that receives a captured image from an image capturing device configured to capture an image of a real space, and transmits an image generated using the captured image to a display device configured to display the transmitted image, the information processing apparatus comprising:

one or more memories that store a set of instructions;
one or more processors that are in communication with the one or more memories, the one or more processors executing the instructions to cause the information processing apparatus to:
detect a position of a moving object from the captured image and determine a speed and an orientation of a movement of the moving object;
acquire a delay time to be occurred from image capturing to image displaying;
predict a position where the moving object will be in the captured image when the image generated using the captured image is to be displayed based on the detected position of the moving object, the determined speed and orientation of the movement of the moving object, and the acquired delay time;
generate a composite image by superimposing a virtual image of the moving object at the predicted position on the captured image;
measure a movement of the image capturing device; and
display the composite image with amending a display position of the composite image on the display device based on the movement of the image capturing device.

2. The information processing apparatus according to claim 1, wherein the display position is amended by shifting the display position based on the movement of the image capturing device.

3. The information processing apparatus according to claim 1, wherein the moving object is a hand, and wherein the hand is detected as a skin color area in the captured image.

4. The information processing apparatus according to claim 3, wherein the captured image of the real space is a stereoscopic image, and wherein a three-dimensional shape of the moving object is acquired from the stereoscopic image and the virtual image of the moving object is generated based on the three-dimensional shape.

5. The information processing apparatus according to claim 1, wherein the movement of the image capturing device is measured based on a change of the position and/or the orientation of the image display apparatus.

6. The information processing apparatus according to claim 1, wherein the moving object is a hand, and wherein the one or more processors execute further instructions to cause the information processing apparatus to estimate a joint angle of a finger of the hand when the image is displayed, and wherein a virtual image of the hand is obtained by changing the finger of the hand based on the estimated joint angle.

7. The information processing apparatus according to claim 6, wherein the estimation is performed based on a learned model for estimating the joint angle of the finger from the captured image.

8. The information processing apparatus according to claim 1, wherein the moving object includes a hand and an object held by the hand, and wherein the moving object is extracted from the captured image of the real space based on a skin color area and a feature set adjacent to the skin color area.

9. The information processing apparatus according to claim 1, wherein the image capturing device and the display device are included in a head- mounted display.

10. The information processing apparatus according to claim 1, wherein the one or more processors execute further instructions to cause the information processing apparatus to perform predetermined image processing on an area of the moving object in the captured image so as to make the area inconspicuous in the composite image.

11. A non-transitory computer-readable storage medium storing a program for causing a computer to execute an information processing method for receiving a captured image from an image capturing device configured to capture an image of a real space, and transmitting an image generated using the captured image to a display device configured to display the transmitted image, the information processing method comprising:
detecting a position of a moving object from the captured image and determining a speed and an orientation of a movement of the moving object;
acquiring a delay time to be occurred from image capturing to image displaying;
predicting a position where the moving object will be in the captured image when the image generated using the captured is to be displayed based on the detected position of the moving object, the determined speed and orientation of the movement of the moving object, and the acquired delay time;
generating a composite image by superimposing a virtual image of the moving object at the predicted position on the captured image;
measuring a movement of the image capturing device; and
displaying the composite image with amending a display position of the generated composite image on the display device based on the movement of the image capturing device.

12. An information processing method for receiving a captured image from an image capturing device configured to capture an image of a real space, and transmitting an image generated using the captured image to a display device configured to display the transmitted image, the information processing method comprising:
detecting a position of a moving object from the captured image and determining a speed and an orientation of a movement of the moving object;
acquiring a delay time to be occurred from image capturing to image displaying;
predicting a position where the moving object will be in the captured image when the image generated using the captured image is to be displayed based on the detected position of the moving object, the determined speed and orientation of the movement of the moving object, and the acquired delay time;
generating a composite image by superimposing a virtual image of the moving object at the predicted position on the captured image;
measuring a movement of the image capturing device; and
displaying the composite image with amending a display position of the generated composite image on the display device based on the movement of the image capturing device.

13. An information processing system including:
an image capturing device which captures an image of a real space;
a display device which displays an image; and
an information processing apparatus that receives a captured image from the image capturing device, and transmits an image generated using the captured image to the display device, the information processing apparatus comprising:
one or more memories that store a set of instructions;

one or more processors that are in communication with the one or more memories, the one or more processors executing the instructions to cause the information processing apparatus to:

detect a position of a moving object from the captured image and determine a speed and an orientation of a movement of the moving object;

acquire a delay time to be occurred from image capturing to image displaying;

predict a position where the moving object will be in the captured image when the image generated using the captured image is to be displayed based on the detected position of the moving object, the determined speed and orientation of the movement of the moving object, and the acquired delay time;

generate a composite image by superimposing a virtual image of the moving object at the predicted position on the captured image;

measure a movement of the image capturing device; and display the composite image with amending a display position of the composite image on the display device based on the movement of the image capturing device.

* * * * *